United States Patent [19]

Ermacora et al.

[11] Patent Number: 5,357,737
[45] Date of Patent: Oct. 25, 1994

[54] MOWER HAVING A DEVICE FOR DRIVING PROCESSING ROLLERS OF THE MOWER

[75] Inventors: Rino Ermacora, St Jean Saverne; Bernard Wattron, Haegen, both of France

[73] Assignee: Kuhn S.A., Saverne Cedex, France

[21] Appl. No.: 136,880

[22] Filed: Oct. 18, 1993

[30] Foreign Application Priority Data

Oct. 16, 1992 [FR] France .................................. 92 12629

[51] Int. Cl.$^5$ ...................... A01D 43/10; A01D 34/76; A01D 69/06; A01D 34/66
[52] U.S. Cl. .................................. 56/16.4 R; 56/13.6; 56/DIG. 1; 56/DIG. 6
[58] Field of Search ...................... 56/16.4, 14.9, 13.5, 56/13.6, DIG. 1, DIG. 24, DIG. 6

[56] References Cited
U.S. PATENT DOCUMENTS

| 4,519,188 | 5/1985 | Webster et al. | |
|---|---|---|---|
| 4,610,128 | 9/1986 | Ermacora | 56/16.4 |
| 4,669,256 | 6/1987 | Ermacora et al. | 56/13.6 |
| 4,694,640 | 9/1987 | Ermacora et al. | 56/16.4 |
| 4,714,123 | 12/1987 | Ermacora et al. | 180/14.4 |
| 4,719,742 | 1/1988 | Ermacora et al. | 56/16.4 |
| 4,720,964 | 1/1988 | Ermacora et al. | 56/13.6 |
| 4,723,396 | 2/1988 | Ermacora | 56/13.6 |
| 4,763,463 | 8/1988 | Ermacora et al. | 56/13.6 |
| 4,771,591 | 9/1988 | Ermacora | 56/13.6 |
| 4,811,553 | 3/1989 | Ermacora et al. | 56/13.6 |
| 4,833,868 | 5/1989 | Ermacora et al. | 56/13.6 |
| 4,848,069 | 7/1989 | Ermacora et al. | 56/15.8 |
| 4,947,629 | 8/1990 | Ermacora et al. | 56/13.6 |
| 4,949,535 | 8/1990 | Hurlburt. | |
| 4,986,064 | 1/1991 | Ermacora | 56/228 |
| 4,991,383 | 2/1991 | Ermacora | 56/14.9 |
| 5,060,462 | 10/1991 | Helfer et al. | 56/14.9 |
| 5,094,063 | 3/1992 | Wattron et al. | 56/6 |
| 5,107,663 | 4/1992 | Wattron et al. | 56/15.7 |
| 5,136,828 | 8/1992 | Ermacora | 56/10.2 |
| 5,199,249 | 4/1993 | Wattron et al. | 56/15.2 |
| 5,199,250 | 4/1993 | Ermacora | 56/15.2 |

FOREIGN PATENT DOCUMENTS

| 159863 | 12/1990 | Denmark. |
| 0429382 | 11/1990 | European Pat. Off.. |
| 0464374 | 1/1992 | European Pat. Off.. |
| 32977 | 2/1985 | Fed. Rep. of Germany. |
| 2268452 | 4/1975 | France. |
| 1209131 | 10/1970 | United Kingdom. |

Primary Examiner—Stephen J. Novosad
Attorney, Agent, or Firm—Oblon, Spivak, McClelland, Maier & Neustadt

[57] ABSTRACT

The invention relates to a mower comprising first and second processing rollers, drive elements that are used to drive one of the first and second processing rollers and transmission elements that transmit the movement of rotation from one of the processing rollers to the other. The transmission elements are installed in a housing and the housing comprises a first part and a second part, connected to one another by a joint with a geometric axis directed at least approximately parallel to the axes of rotation of the processing rollers. Each of the parts of the housing is, in addition, mounted to pivot at least approximately around the axis of rotation of the corresponding processing roller.

25 Claims, 7 Drawing Sheets

MOWER HAVING A DEVICE FOR DRIVING PROCESSING ROLLERS OF THE MOWER

BACKGROUND OF THE INVENTION

Field of the Invention

This invention relates to a mower which comprises a mowing group equipped with cutting elements and extending crosswise to the direction of work; two counter-rotating processing rollers, whose axes of rotation extend at least approximately parallel to one another, so as to cause the flow of cut product to pass between the processing rollers, each processing roller comprising a drive shaft; a device for guiding the processing rollers making it possible for the processing rollers to adjust to the thickness of the flow of product to be processed; drive elements that are used to drive the first of the processing rollers; and transmission elements, that can comprise some of the drive elements, and that transmit the rotation movement from the first processing roller to the second processing roller, regardless of the spacing of the processing rollers allowed by the guide device during work.

Discussion of the Related Art

A conventional mower is described in EP-0 464 374. This known mower has a cutting bar with disks extending crosswise to the direction of work. Behind the cutting bar a box is installed, in which two counter-rotating processing rollers are placed that extend horizontally one above the other. The lower roller is guided directly into the lateral walls of the box, while the upper roller is hinged to each lateral wall of the box, by a respective guide arm installed inside the box. This guide arm places the upper roller in contact with the lower roller, while making it possible for the upper roller to move away from the lower roller when the thickness of the flow of product to be processed increases. Furthermore, the two processing rollers of this known mower rotate at the same speed, regardless of the spacing between the two rollers allowed by the guide arms. This result is obtained by four toothed wheels meshing successively with one another. The first toothed wheel is mounted on the drive shaft of the lower roller, the second is hinged to the box, the third is hinged on the pivoting axis of the guide arm and the fourth is mounted on the drive shaft of the upper roller. All these toothed wheels are installed outside of the box without any protection. The driving of the wheels is achieved by a belt-and-pulley device, also installed outside of the box.

This known mower advantageously has transmission elements whose lateral space requirement is slight and which are intended to transmit the movement of rotation between the processing rollers, regardless of the spacing of the processing rollers allowed by the guide arm.

However, this known mower exhibits drawbacks. Actually, considering that the toothed wheels are installed outside of the box without any protection, they run the risk of being quickly damaged.

Moreover, it is difficult to lubricate these transmission elements properly.

SUMMARY OF THE INVENTION

An object of the present invention is to improve this known mower, while retaining transmission elements that are compact and intended to transmit the movement of rotation between the processing rollers, regardless of the spacing of the processing rollers allowed by the guide device during work.

For this purpose, in the mower of the present invention the transmission elements are installed in a housing. This housing comprises a first part and a second part hinged to one another by a joint with a geometric axis directed at least approximately parallel to the axes of rotation of the processing rollers, and each of the parts is, in addition, mounted to pivot at least approximately around the axis of rotation of the corresponding processing roller.

Since the transmission elements of the mower according to the present invention are installed inside a housing, they are better protected.

Moreover, there is no danger of being injured by the transmission elements.

In addition, the transmission elements comprise at least a pair of toothed elements to make the transmission rollers counter-rotating.

Considering that on the inside of a housing the lubrication of the transmission elements is considerably simplified, it can be better assured.

Moreover, considering the fact that each of the two parts of the housing is mounted to pivot in relation to the rest of the machine, fluidtightness of the housing is easy to achieve.

According to a further feature of the present invention, it is also provided that the housing is at least approximately closed and at least approximately fluidtight.

To obtain a driving of the processing rollers that is precise, reliable and of good efficiency, it is also provided that the transmission elements comprise exclusively toothed elements.

According to a still further feature of the present invention, it is also provided that the transmission elements comprise three rotating elements. The three rotating elements are a first rotating element fastened to the drive shaft of the first processing roller; a second rotating element centered on the geometric axis of the joint linking together the two parts of the housing and driven in rotation by the first rotating element; and a third rotating element fastened to the drive shaft of the second processing roller and driven in rotation by the second rotating element.

In a further embodiment of the invention, the second rotating element comprises a ring gear, toothed on its inside periphery and on its outside periphery, while the other two rotating elements are toothed wheels one of which meshes with the inside periphery of the toothed ring gear and the other with the outside periphery of the toothed ring gear.

In this embodiment, the toothed wheel corresponding to the first rotating element can, for example, mesh with the outside periphery of the toothed ring gear, while the other toothed wheel corresponding to the third rotating element meshes with the inside periphery of the toothed ring gear.

Because of this, the toothed wheel which meshes with the outside periphery of the toothed ring gear is mounted on the processing roller driven by the drive elements, i.e., the first processing roller.

The first processing roller extends at least approximately horizontally, crosswise to the direction of work and lower than the second processing roller. This first processing roller is also offset backward, considering the direction of advance during work, so that the processed product is thrown backward and upward.

On the other hand, the transmission elements are at least approximately coplanar and the lateral space requirement of the housing is reduced.

According to a further feature of the present invention, it is provided that the drive elements drive the first processing roller on the side where the drive elements are installed. The two drive shafts of the processing rollers are therefore installed on the same side. As a result, it is possible to place the drive elements and the transmission elements so that they are easily accessible. Considering that the drive elements and the transmission elements can be installed on the same side, this frees up space on the other side of the processing rollers.

According to another feature of the present invention, it is furthermore provided that the drive elements directly drive the drive shaft of the first processing roller. Due to this characteristic, if ever a transmission element should break, it is possible to remove one of the transmission elements from the lateral housing, indeed the entire lateral housing, so as to be able to continue to work while maintaining the driving of the first processing roller.

In this respect, the drive shaft of the first processing roller passes through the first part of the housing from one side to the other, the drive shaft comprises at its end located just on the other side of the first part, a drive element by which the first processing roller is driven directly.

A further embodiment is obtained when one of the two parts of the housing comprises at least one disk pivoting around the geometric axis of the joint linking together the two parts of the housing, the pivoting disk, in an off-centered way, is passed through by the drive shaft of one of the processing rollers.

In this case, the second part of the housing can, for example, comprise only a single pivoting disk connected to the first part of the housing by the joint.

In the mower according to the invention, in addition it is provided that the two processing rollers extend between two walls installed at least approximately at right angles with the axes of rotation of the processing rollers, a pivot pin is placed at each longitudinal end of each processing roller, the guide device comprises four bearings, by which the pivot pins are guided, and the guide device is connected to the walls.

The guide device can comprise elastic connections that serve to attenuate the vibrations of the processing rollers. A further embodiment is obtained when one of the elastic connections is produced by at least one elastic element by which each bearing being used to guide one of the processing rollers is fastened to the corresponding wall.

The guide device can also comprise two guide arms, so that each bearing being used to guide one of the processing rollers is connected to the corresponding wall by one of the guide arms, hinged to the wall by a joint exhibiting a pivoting axis parallel to the axis of rotation of the processing roller, so that this processing roller can be separated from the other processing roller by pivoting around the pivoting axis. A further embodiment is obtained when one of the elastic connections is produced by an elastically deformable element installed between each guide arm and the corresponding wall so as to bring back and press the processing roller against the other processing roller.

Preferably, the guide arms and the bearings extend outside the walls. As a result of this arrangement, the guide arms do not hamper the passage of the flow of cut product and the cut product does not run the risk of being lodged between the guide arm and the corresponding wall.

Further, on the side where the housing is installed, it is advantageous that the corresponding bearings extend between the housing and the respective wall.

To guarantee a relatively quiet operation of the processing rollers, it is advantageous that the housing be fastened to the corresponding wall by elastic elements.

In addition, in the embodiments where each bearing that is used to guide one of the processing rollers is fastened to the corresponding wall by at least one elastic element, it is provided that one of the parts of the housing be fastened to one of the bearings, and that the elastic elements comprise the elastic element(s) serving to connect the bearing to the corresponding wall.

The part of the housing can in addition be fastened directly to the wall by another of the elastic elements, to complete this elastic connection.

The mower according to the invention can also comprise two groups of two processing rollers located beside one another, and whose respective transmission elements are installed on the outsides of the two groups.

Moreover, this mower is intended to be connected to a powerdriven vehicle.

Accordingly, the present invention relates to a mower which comprises a mowing group equipped with cutting elements and extending crosswise to a direction of work of the mower; first and second counter-rotating processing rollers having axes of rotation which extend at least approximately parallel to one another for causing a flow of cut product to pass between the first and second processing rollers, each of the first and second processing rollers comprising a drive shaft; a device for guiding the first and second processing rollers for allowing the first and second processing rollers to adjust to a thickness of the flow of the product to be processed; drive elements that are used for driving the first processing roller; and transmission elements which comprise some of the drive elements, the transmission elements transmitting a rotation movement from the first processing roller to the second processing roller, regardless of a spacing of the first and second processing rollers allowed by the guide device during work.

The transmission elements are installed in a housing and the housing comprises a first part and a second part which are hinged to one another by a joint. The joint has a geometric axis which is directed at least approximately parallel to the axes of rotation of the first and second processing rollers and each of the first and second parts is mounted to pivot at least approximately around the axis of rotation of a corresponding one of the first and second processing rollers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
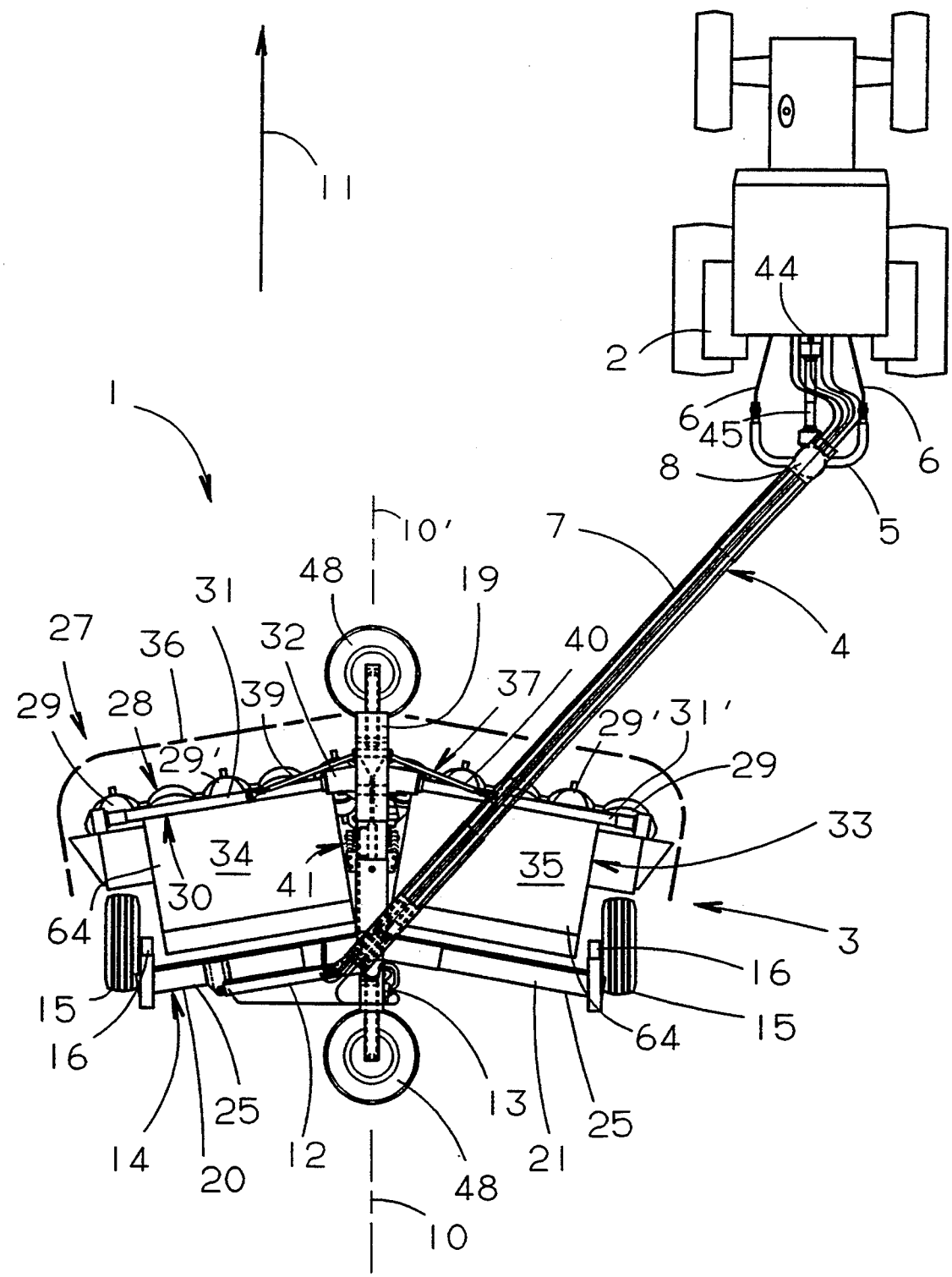
FIG. 1 represents a top view of a mower according to the invention hitched to a farm tractor.

Referring now to the drawings, wherein like reference numerals designate identical or corresponding parts throughout the several views, and more particularly to FIG. 1 thereof, FIG. 1 shows a mower (1) according to the invention which is hitched to a farm tractor (2).

The mower (1) is composed of a body (3) and a tongue (4). Tongue (4) is composed of a primary tongue (5) intended to be hitched to the lower arms (6) of the hitch of the farm tractor (2) and of a and of a secondary tongue (7) connected to the body (3) of the mower (1). Primary tongue (5) is connected to the front end of secondary tongue (7) by a connecting device (8) known to a person skilled in the art and which allows in particular a pivoting of primary tongue (5) in relation to secondary tongue (7) around a pin that is at least approximately vertical. Near its back end, secondary tongue (7) is connected to body (3) by a joint (not shown) with a geometric axis (9) (see FIG. 2) that is at least approximately vertical and extends at least approximately in the median vertical plane (10) of body (3), directed in direction of advance (11) during work. The angular position of tongue (4) in relation to body (3) can be modified by having tongue (4) pivot around geometric axis (9) of the joint. The putting into the desired angular position and the holding in this position are performed by an actuation cylinder (12) associated with a detection device (13). As a result of this arrangement, body (3) of mower (1) can, during work, extend - as seen from the back in direction of advance (11) during work either to the right, or to the left of farm tractor (2). This allows back and forth mowing.

Body 3 of mower (1) has a frame (14) that rests on the ground—during work—by two work wheels (15) that each extend near a respective outside end of frame (14). Each work wheel (15) is connected to the frame (14) by a wheel arm (16) itself connected to the frame (14) by a joint (17) of the pivot pin type with a geometric axis directed at least approximately perpendicular to direction of advance (11) during work. The geometric axes of joints (17) of the two work wheels (15) are at least approximately merged. Between each wheel arm (16) and frame (14) a hydraulic cylinder (18) is furthermore provided which makes it possible to have wheel arm (16) and corresponding work wheel (15) pivot in relation to frame (14) around the geometric axis of corresponding joint (17). This makes it possible for frame (14) to be brought close to the ground during the mowing phase and to be moved away from the ground when the mowing is interrupted.

Figure 2:
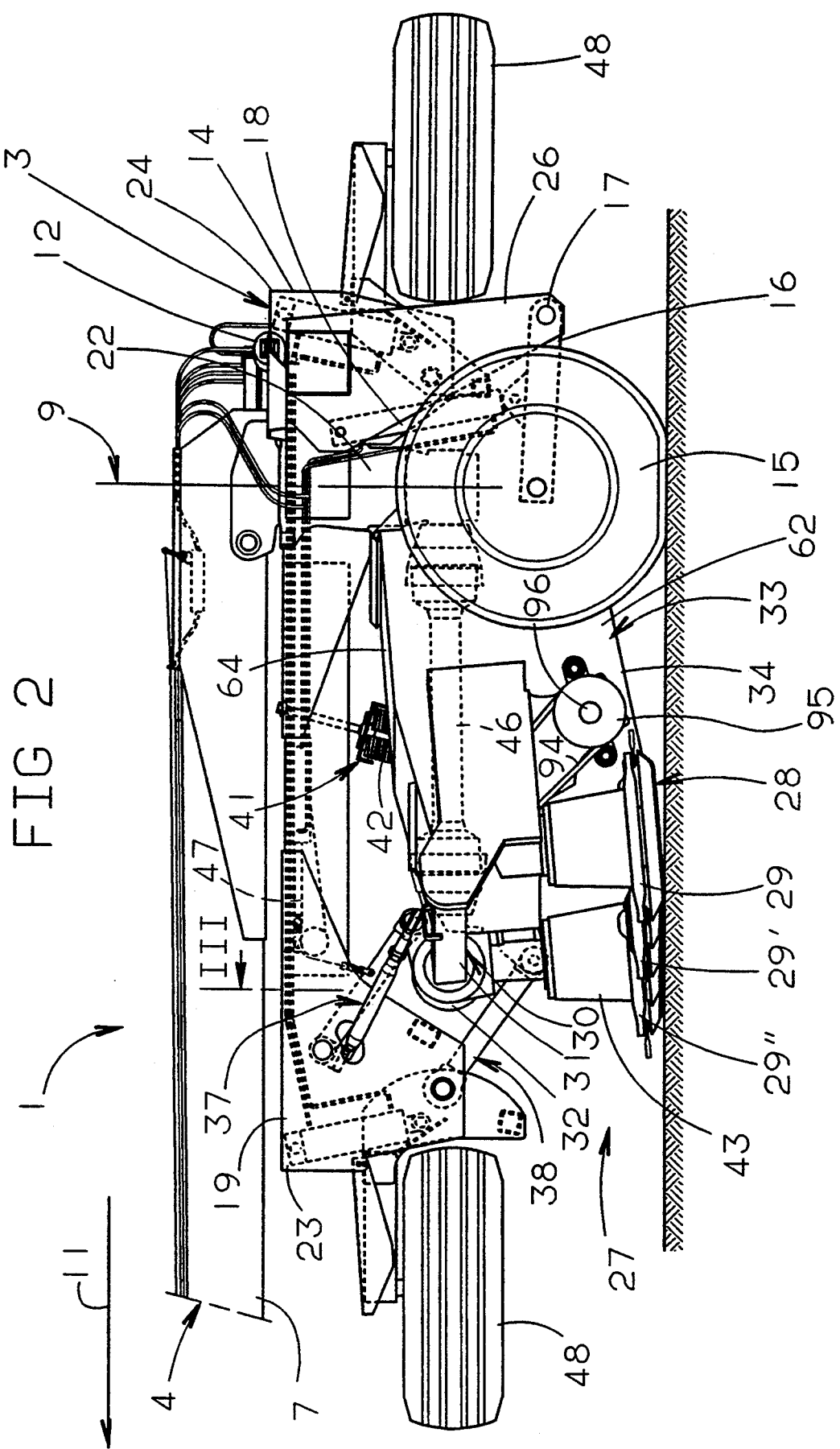
FIG. 2 represents a lateral view of the body of the mower in a work position.

In FIG. 1, the shape of frame (14) also appears very accurately. It is composed essentially of a middle element (19) and of two side elements (20, 21) that each extend on a respective side of the middle element (19). Middle element (19) is composed mainly of a bearing (22) and two brackets (23, 24) that extend at least approximately horizontally and at least approximately in direction of advance (11) during work (FIG. 2). These two brackets—a front bracket (23) and a rear bracket (24)—are connected rigidly, but nevertheless in a removable manner, at the front, or at the back of bearing (22). Side elements (20, 21), each consist of a beam (25) that extends at least approximately horizontally and crosswise to direction of advance (11) during work, and at the outside end of which, i.e., the end away from bearing (22), a leg (26) is fastened that extends downward. At the lower end of this leg (26), wheel arm (16) of corresponding work wheel (15) is connected. Each side element (20, 21) is also connected rigidly and in a removable way to bearing (22).

Figure 3:
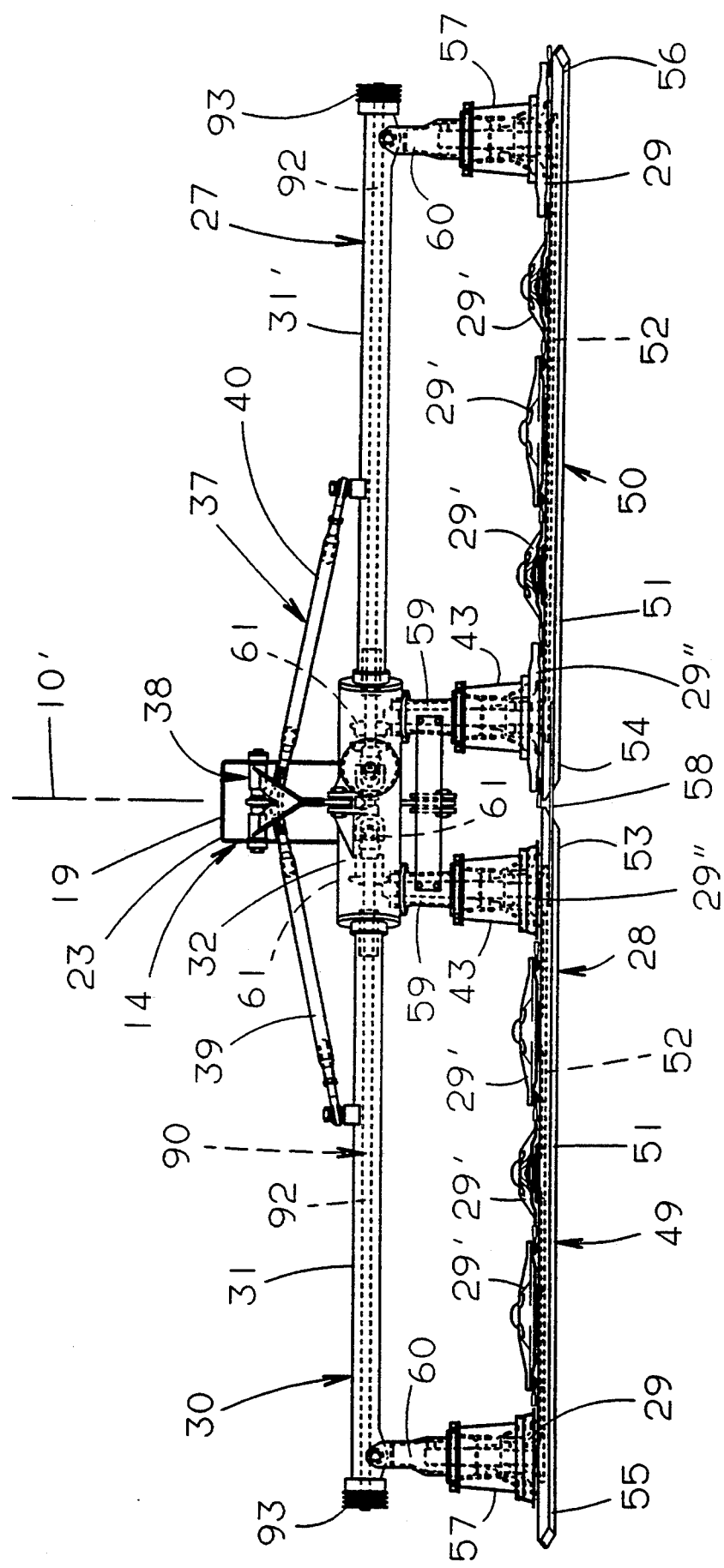
FIG. 3 represents a section along plane III of FIG. 2.

As illustrated in FIGS. 1, 2 and 3, the mower (1) has a harvesting mechanism (27) that extends under front bracket (23) of middle element (19) of frame (14) and crosswise to direction of advance (11) during work. This harvesting mechanism (27) is composed of a cutting bar (28) supporting cutting elements (29, 29', 29") and a carrying structure (30) supporting processing elements (33). Carrying structure (30) comprises two beams (31, 31') and an input housing (32) located more precisely under front bracket (23) and in median vertical plane (10') of harvesting mechanism (27) directed in direction of advance (11) during work. In the example shown, the median vertical plane (10') is merged with vertical plane (10) of body (3). On both sides of input housing (32) the two beams (31, 31') are connected in a removable way and are arranged symmetrically in relation to the median plane (10'). These beams (31, 31') extend approximately horizontally and approximately parallel to side elements (20, 21) of frame (14). Processing elements (33) are divided in two groups (34, 35) of processing elements (33), each fastened to a respective beam (31, 31') of harvesting mechanism (27). They extend behind cutting elements (29) to treat the product cut by the latter. The two groups (34, 35) of processing elements (33) are, like beams (31, 31'), arranged symmetrically in relation to median plane (10') of harvesting mechanism (27). In addition, protective elements (36), represented in dot-and-dash lines in FIG. 1, surround the front part of harvesting mechanism (27).

A suspension device (37) connects harvesting mechanism (27) to frame (14). This suspension device (37) is known to a person skilled in the art and comprises an approximately vertical deformable parallelogram (38), installed between front bracket (23) of frame (14) and the front part of harvesting mechanism (27). Considering its central installation, this deformable parallelogram (38) makes possible a good adapting of harvesting mechanism (27) to the ground. Suspension device (37) also comprises two lateral suspension elements (39, 40) installed symmetrically on both sides of front bracket (23), so as to prevent the pivoting of harvesting mechanism (27) around a straight line directed upward. As a result, suspension device (37) allows only a displacement in height of harvesting mechanism (27), as well as an inclination of the harvesting mechanism (27) in relation to frame (14) crosswise to direction of advance (11) during work.

A load-lightening device (41) whose structure appears in FIGS. 1 and 2, works with suspension device (37). This load-lightening device (41) comprises a group of four draw springs (42) (FIG. 2) located in the vicinity of the vertical plane directed in direction of advance (11) during work and containing the center of weights of harvesting mechanism (27). It is also seen that the load-lightening device (41) extends between the two groups (34, 35) of processing elements (33) and just behind two rotors (43) extending one after the other in the middle part of cutting bar (28).

The driving of harvesting mechanism (27) is performed from power take-off (44) of tractor (2), which is attached, by a telescopic shaft with universal joints (45), a kinematic chain known to a person skilled in the art that ends at input housing (32) of harvesting mechanism (27) by another telescopic shaft, with universal joints (46) (FIG. 2).

As can be seen in FIG. 2, mower (1) also comprises a device (47) for lifting harvesting mechanism (27). This lifting device (47) makes it possible to displace in height harvesting mechanism (27) by deformation of deformable parallelogram (38).

FIGS. 1 and 2 further illustrate that mower (1) comprises two transport wheels (48) that are used to transport mower (1) in a direction perpendicular to direction of advance (11) during work. Considering that the installation and the operation of these transport wheels (48) are known to a person skilled in the art, they will not be described in further detail.

As stated above, harvesting mechanism (27) comprises in particular a cutting bar (28) with cutting elements (29, 29', 29'') and two groups (34, 35) of elements (33) for processing the product cut by the cutting elements (29, 29', 29'').

The cutting bar (28) is made in two parts (49, 50) (FIG. 3) each provided with a certain number of the cutting elements (29, 29', 29'').

Each cutting bar part (49, 50) comprises a housing (51) above which corresponding cutting elements (29, 29', 29'') extend. The cutting elements (29, 29', 29'') are, in the example shown, made in the form of rotating cutting elements each turning around a respective axis directed upward. For this purpose, the cutting elements (29, 29', 29'') are guided in rotation in corresponding housing (51) which contains a portion of drive elements (52) of the rotating cutting elements (29, 29', 29''). This arrangement is known to a person skilled in the art and therefore will not be described in further detail. Furthermore, cutting element (29'') extending at the end (53, 54) of one cutting bar part (49, 50) adjacent to the other cutting bar part (49, 50), is surmounted by a rotor (43) turning around the same axis as the cutting element (29''). These rotors (43) extend just in front of load-lightening device (41). Cutting element (29) extending at the outside end (55, 56) of a cutting bar part (49, 50) is also surmounted by a rotor (57) turning around the same axis as cutting element (29). These rotors (43, 57) are used to channel the flow of cut product in the direction of the two groups (34, 35) of processing elements (33).

In FIGS. 1 and 3, it is further illustrated that the two cutting bar parts (49, 50) are directly coupled to one another by a coupling element (58). This coupling element (58) extends, as seen from above, essentially behind the housings (51) of the two cutting bar parts (49, 50) and is bolted at each of their adjacent ends (53, 54). Furthermore, this coupling element (58) extends, in the example shown, under the cutting plane produced by cutting elements (29'') placed at the adjacent ends (53, 54) of the two cutting bar parts (49, 50).

As stated before, cutting bar (28) thus formed, is connected to carrying structure (30). For this purpose, the carrying structure (30) comprises two central carrying elements (59) and two outside carrying elements (60), so that each cutting bar part (49, 50) is connected at its end (53, 54) near the other cutting bar part (49, 50) to a central carrying element (59) and at its outside end (55, 56) to an outside carrying element (60).

The driving of cutting elements (29, 29', 29'') of each cutting bar part (49, 50) is performed by drive elements (52) installed on the inside of housing (51) of the cutting bar part (49, 50). Drive elements (52) of each housing (51) receive the movement of rotation from the telescopic shaft with universal joints (46) by transmission elements (61) known to a person skilled in the art, and installed in input housing (32), as well as in the respective central carrying element (59). The product cut by cutting elements (29, 29', 29'') of cutting bar (28) is then conveyed by the cutting elements (29, 29', 29'') to groups (34, 35) of processing elements (33) which each process a portion of the flow of cut product.

Figure 4:
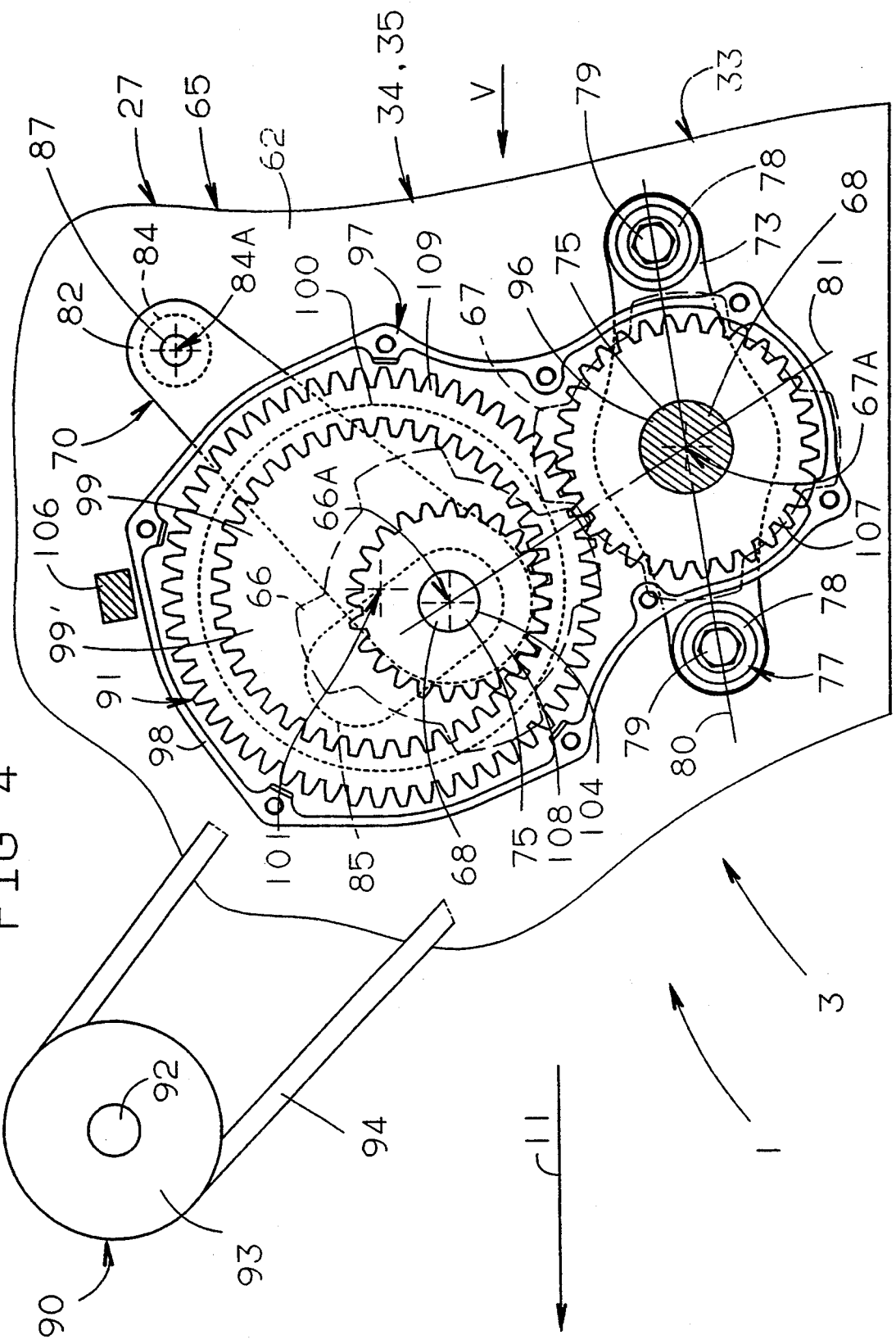
FIG. 4 represents an enlarged lateral view of the drive of a group of processing rollers of the mower.

Each group (34, 35) of processing elements (33) comprises two lateral walls (62, 63) extending at least approximately at right angles with corresponding housing (51) and fastened at their front end to carrying structure (30). An upper part (64) that is at least approximately horizontal connects the two lateral walls (62, 63) to one another, so as to form a box (65) (FIG. 4). In this box (65), the processing of the flow of cut product is performed by two processing rollers (66, 67) exhibiting a respective axis of rotation (66A, 67A) extending at least approximately parallel to housing (51) of corresponding cutting bar part (49, 50). These processing rollers (66, 67) are counter-rotating and extend above one another so that the flow of cut product passes between the processing rollers (66, 67). To process the cut product more effectively, processing rollers (66, 67) can, for example, be covered with rubber exhibiting ribs in the shape of chevrons. To throw the processed product backward and upward, lower processing roller (67) is furthermore slightly offset backward in relation to upper processing roller (66).

As shown in FIGS. 4 to 7, processing rollers (66, 67) are connected at each of their long ends (68, 69) to corresponding lateral wall (62, 63) of box (65), by a guide device (70). This guide device (70) tends at least approximately to hold processing rollers (66, 67) in contact with one another, while making it possible for the processing rollers (66, 67) to temporarily move away from one another when the thickness of the flow of product to be processed increases.

Guide device (70) comprises four ball-pivoting bearings (71, 72, 73, 74) that are used to guide processing rollers (66, 67) at each of their longitudinal ends (68, 69). At each longitudinal end (68, 69), each processing roller (66, 67) has a pivot pin (75, 76) for this purpose. These four pivot pins (75, 76) each carry a ball-pivoting bearing (71, 72, 73, 74) connected directly or indirectly to the outside of lateral walls (62, 63) of box (65).

Ball-pivoting bearings (73, 74) of lower processing roller (67), for example, are each fastened to the corresponding lateral wall (62, 63) by elastic connections (77) that are used to attenuate, even absorb, the vibrations of the processing roller (67) during work. In the example shown in the figures, each elastic connection (77) is made by means of two elastic elements (78) of the "silentbloc" type or the like, integral with corresponding ball-pivoting bearing (73, 74), and each fastened to a respective lateral wall (62, 63) with a bolt (79). To attenuate as much as possible the vibrations of this processing roller (67) which are propagated perpendicular to its axis of rotation (67A), elastic elements (78) extend at least approximately symmetrically on both sides of the axis of rotation (67A) and the longitudinal axis of each bolt (79) extends at least approximately parallel to the axis of rotation (67A). Advantageously, the longitudinal axes of bolts (79) extend at least approximately in a geometric plane (80) directed at least approximately at right angles with a geometric plane (81) containing the axes of rotation (66A, 67A) of the two processing rollers (66, 67).

Ball-pivoting bearings (71, 72) of upper processing roller (66) are each connected to the corresponding lateral wall (62, 63) by a respective guide arm (82, 83). Guide arms (82, 83) are connected to lateral walls (62, 63) of box (65) by a joint (84) exhibiting a pivoting axis (84A) parallel to the axis of rotation of upper processing roller (66). In this way, guide arms (82, 83) allow a pivoting upward of upper processing roller (66) in relation to lower processing roller (67) around pivoting axis (84A) of the guide arms (82, 83). To allow such a pivoting, each lateral wall (62, 63) exhibits an oblong hole (85, 86) through which corresponding pivot pin (75, 76) passes and that makes possible the displacement of the pivot pin (75, 76) in relation to the lateral wall (62, 63).

Figure 6:
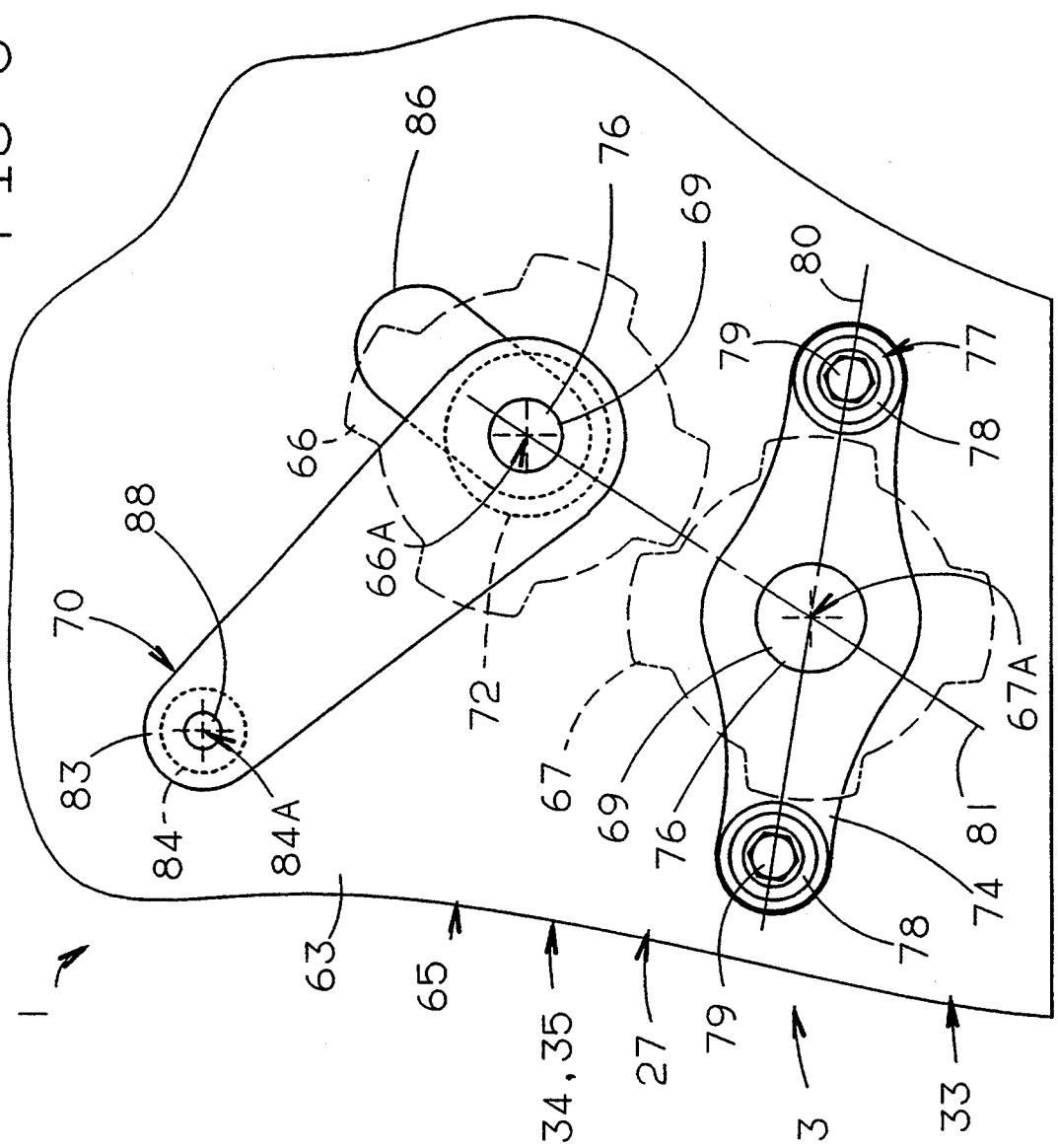
FIG. 6 represents a lateral view opposite the group of processing rollers of FIG. 4.
Figure 7:
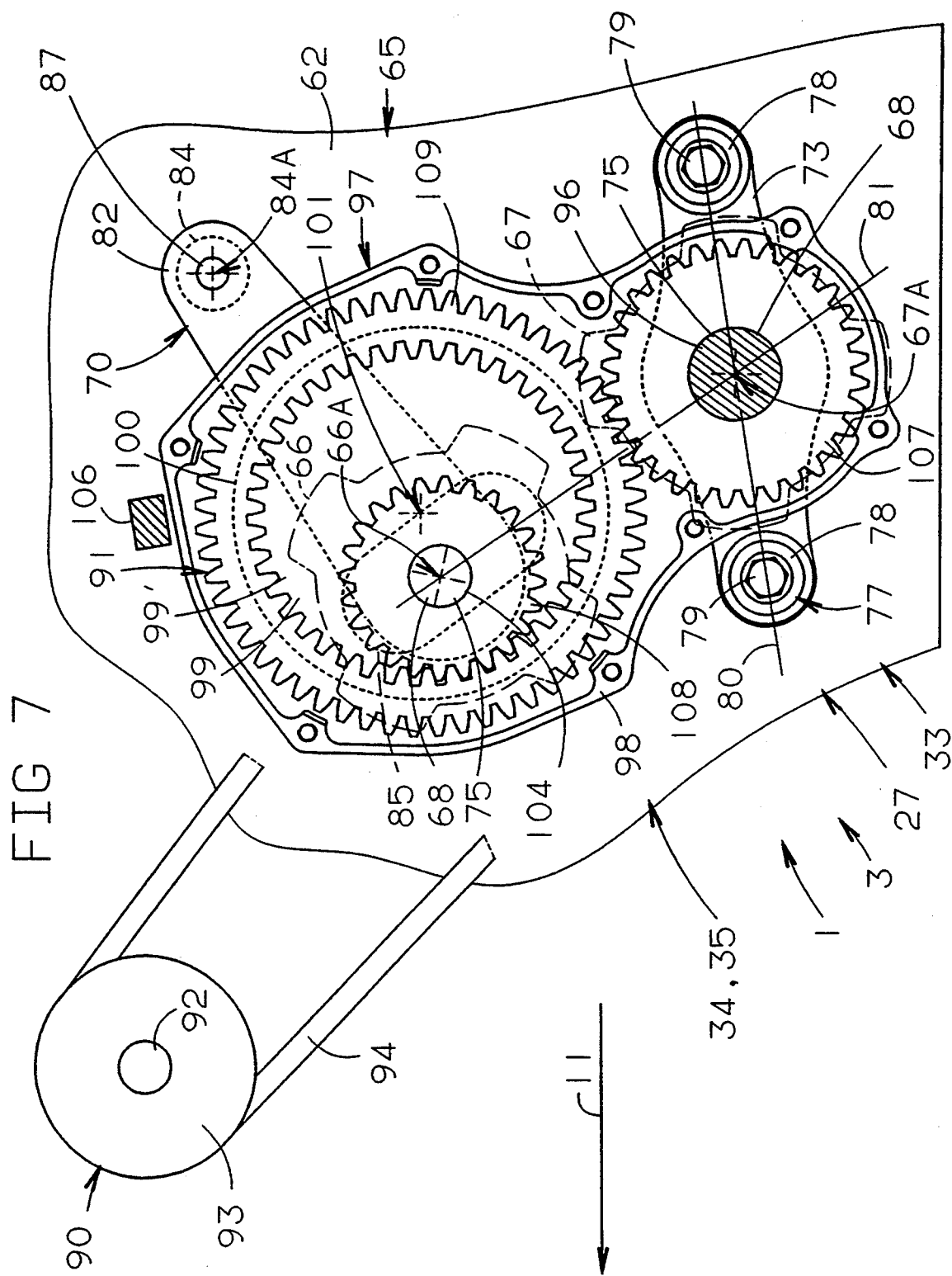
FIG. 7 represents a lateral view of the drive of a group of processing rollers when the latter are separated in relation to one another.

Pivoting axis (84A) and the two axes of rotation (66A, 67A) of processing rollers (66, 67) define a triangle that is at least approximately equilateral (FIGS. 4, 6 and 7). In these figures, it can also be observed that, considering the direction of advance (11) during work, the pivoting axis (84A) extends behind geometric plane (81) defined by the axes of rotation (66A, 67A).

To each guide arm (82, 83) an elastically deformable element (87, 88) is rigidly connected that is made in the form of a torsion bar, for example. Due to these two elastically deformable elements (87, 88), upper processing roller (66) is continuously brought back and pressed against lower processing roller (67). By so doing, the processing of the cut product is better assured. The intensity of the processing can be modulated by a central regulating device (89) (FIG. 5) known to a person skilled in the art and that acts simultaneously on the two elastically deformable elements (87, 88).

The driving of each group (34, 35) of processing elements (33) is performed by drive elements (90) and transmission elements (91) installed symmetrically on both sides of median vertical plane (10') of harvesting mechanism (27). Actually, in each beam (31, 31') of carrying structure (30) a corresponding shaft (92) is provided that extends from input housing (32) to the outside end of respective beam (31, 31') where each shaft (92) carries a corresponding first rotating element (93) of the pulley type, for example. Each first rotating element (93) drives, via an endless element (94), a second rotating element (95) fastened to corresponding drive shaft (96) of lower processing roller (67) of each group (34, 35) of processing elements (33). This drive shaft (96) advantageously comprises corresponding pivot pin (75). For each group (34, 35) of processing elements (33), the above-described drive elements (90) therefore drive directly each lower processing roller (67).

In the example shown in the figures, transmission elements (91) transmit the movement of rotation of lower processing roller (67) to upper processing roller (66), regardless of the position of upper processing roller (66) in relation to lower processing roller (67) allowed by guide device (70).

Figure 5:
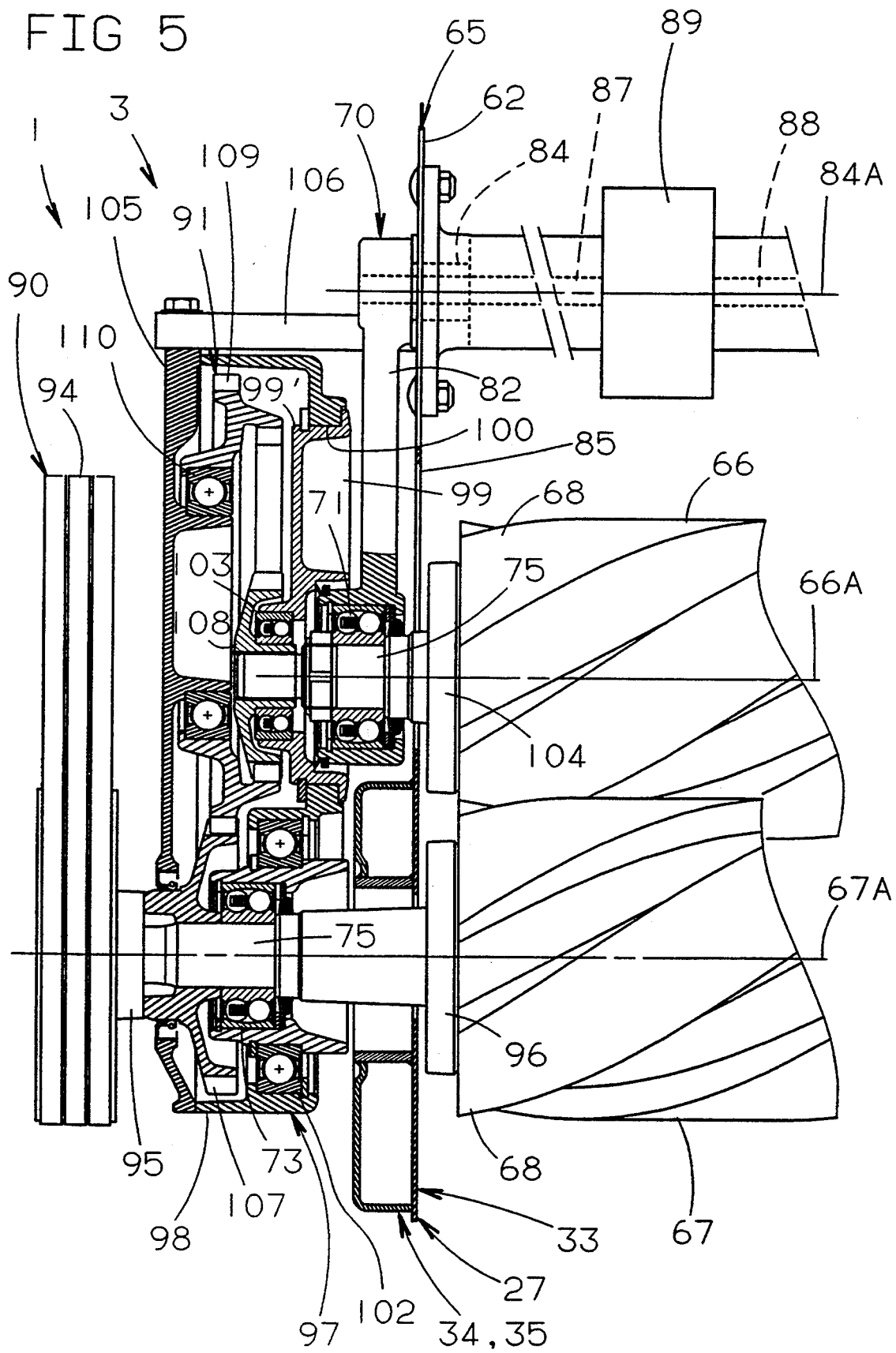
FIG. 5 represents a section of the drive of the group of processing rollers seen along arrow V of FIG. 4.

According to the invention, these transmission elements (91) are installed in a lateral housing (97) comprising two parts (98, 99) connected to one another by a joint (100) with a geometric axis (101) (FIGS. 4 and 7) directed at least approximately parallel to the axes of rotation (66A, 67A) of processing rollers (66, 67). Each of the parts (98, 99) is, in addition, mounted to pivot at least approximately around the corresponding axis of rotation (66A, 67A) of one of processing rollers (66, 67). As can be seen in FIG. 5, the first part (98) of lateral housing (97) is mounted, by a bearing (102) with a row of radial contact balls, on corresponding ball-pivoting bearing (73) of lower processing roller (67), while the second part (99) in the shape of a pivoting disk (99'), is mounted in an off-centered way, by a ball-pivoting bearing (103) on drive shaft (104) of upper processing roller (66). As for lower processing roller (67), drive shaft (96) comprises corresponding pivot pin (75). In the examples of the embodiment where lateral housing (97) comprises a second part (99) in the shape of a pivoting disk (99'), its geometric axis (101) extends higher than the axis of rotation (66A) of upper processing roller (66) when processing rollers (66, 67) are at least approximately in contact with one another.

Furthermore, when upper processing roller (66) moves a from lower processing roller (67), drive shaft (104) of the upper processing roller (66) turns with the second part (99) of lateral housing (97) around geometric axis (101) of joint (100) embodied by the outside periphery of pivoting disk (99') of the second part (99).

First part (98) of lateral housing (97) comprises, in addition, a lateral cover (105) (FIG. 5) that, using a screw (not shown), closes the entire lateral housing (97). By removing lateral cover (105), it is advantageously possible to access all of the transmission elements (91) installed inside lateral housing (97). The above-described lateral housing (97) is at least approximately fluidtight and fastened to outside lateral wall (62) of box (65) by ball-pivoting bearing (73) with silentblocs, previously described, and by an elastic element (106) connected to the upper end of first part (98) of lateral housing (97). This elastic element (106) has as its function to complete the elastic connection (77) that is used to attenuate the vibrations of lower processing roller (67) during its rotation, while connecting, also in an elastic manner, lateral housing (97) to outside lateral wall (62).

As stated previously, transmission elements (91) are intended to transmit the movement of rotation of lower processing roller (67) to upper processing roller (66). For this purpose, transmission elements (91) comprise two toothed wheels (107, 108) and a ring gear (109) toothed on its inside periphery and on its outside periphery. The first toothed wheel (107) is mounted on drive shaft (96) which carries the second rotating element (95) of drive elements (90) and is located more precisely between lateral cover (105) of lateral housing (97) and corresponding ball-pivoting bearing (73). This toothed wheel (107) meshes with the outside periphery of toothed ring gear (109) which is connected to lateral cover (105) of lateral housing (97) by a bearing (110) with a row of radial contact balls, and which is centered on geometric axis (101) of pivoting disk (99'). While turning, toothed ring gear (109) also meshes on its inside periphery with the third toothed wheel (108), mounted at the end of drive shaft (104) of upper processing roller (66), which for this purpose passes through pivoting disk (99') of lateral housing (97). Toothed ring gear (109) and the second toothed wheel (108) therefore extend more precisely between lateral cover (105) and pivoting disk (99').

The driving of the processing rollers (66, 67) of each group (34, 35) of processing elements (33) operates as follows. Drive elements (90) directly drive shaft (96) of lower processing roller (67) by means of the second rotating element (95). The first toothed wheel (107), fastened to the same drive shaft (96), transmits the movement of rotation via toothed ring gear (109), to the second toothed wheel (108), therefore to drive shaft (104) of upper processing roller (66). The two processing rollers (66, 67) are therefore driven continually. In the example shown in the figures, processing rollers (66, 67) are identical and driven at the same speed. As soon as the flow of product to be treated increases or in case of an obstacle, upper processing roller (66) moves away from lower processing roller (67) by pivoting around joint (84) connecting guide arms (82, 83) to lateral walls (62, 63) of box 65. By so doing, pivoting disk (99') of lateral housing (97) turns around its geometric axis (101) and causes the first part (98) of the lateral housing (97) to pivot around axis of rotation (67A) of lower processing roller (67), so as to maintain the meshing of the second toothed wheel (108) with toothed ring gear (109), despite the displacement in height of upper processing roller (66) (FIGS. 4 and 6).

When the flow of product to be treated diminishes, or as soon as the obstacle has passed between processing rollers (66, 67), upper processing roller (66) returns at least approximately in contact with lower processing roller (67) under the effect of the weight of the upper processing roller (66), combined with the action of elastically deformable elements (87, 88) acting on guide arms (82, 83). By so doing, the two parts (98, 99) of lateral housing (97) pivot in reverse direction until returning to their initial position while maintaining the meshing of the second toothed wheel (108) with toothed ring gear (109).

The driving of processing rollers (66, 67) of this mower (1) according to the invention also exhibits the following advantages:

Drive elements (90) and transmission elements (91) are arranged on one side of box (65). It is thereby possible to place them on the side of box (65) where they are the most accessible.

On the other hand, considering that drive elements (90) and transmission elements (91) are arranged on one side of box (65), this frees up space on the other side of box (65). Such an arrangement makes it possible, for example, to install load-lightening device (41) between two boxes (65), as appears on mower (1) according to the invention.

Since the two processing rollers (66, 67) are driven synchronously regardless of the displacement of one of the processing rollers (66, 67) in relation to the other, the product to be cut is better processed. Moreover, since processing rollers (66, 67) thereby mesh with greater precision, their wear is reduced.

Considering the fact that transmission elements (91) are at least approximately coplanar, the lateral space requirement of housing (97) is particularly reduced.

In addition, the two rotating elements (93, 95) and endless element (94) also exhibit a reduced lateral space requirement.

As can be seen in the figures, the overall lateral space requirement of these drive elements (90) and of transmission elements (91) is therefore very reduced.

Since the transmission elements (91) of the mower according to the invention are installed inside lateral housing (97), they are better protected.

Furthermore, there is no danger of being injured by transmission elements (91).

Considering that on the inside of lateral housing (97), the lubrication of the transmission elements is considerably simplified, it can be better assured.

Moreover, considering the fact that each of the two parts (98, 99) of lateral housing (97) is mounted to pivot in relation to the rest of machine (1), fluidtightness of lateral housing (97) is easy to achieve.

The mounting of processing rollers (66, 67) and of lateral housing (97) on elastic elements (77, 87, 88, 106) guarantees a relatively quiet operation with a minimum of vibrations.

In addition, if ever a transmission element (91) should break, it is possible to quickly remove one (107, 108, 109) of the transmission elements (91) from lateral housing (97), indeed the entire lateral housing (97), so as to be able to continue to work while maintaining the driving of lower processing roller (67).

Considering that guide arms (82, 83) are installed outside of box (65), they do not hamper the passage of the flow of cut product and the cut product does not run the risk of being lodged between guide arm (82, 83) and corresponding wall (62, 63).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower comprising:
   a mowing group equipped with cutting elements and extending crosswise to a direction of work of said mower;
   first and second counter-rotating processing rollers having axes of rotation which extend at least approximately parallel to one another for causing a flow of cut product to pass between said first and second processing rollers, each of said first and second processing rollers comprising a drive shaft;
   a device for guiding said first and second processing rollers for allowing said first and second processing rollers to adjust to a thickness of the flow of the product to be processed;
   drive elements that are used for driving said first processing roller; and
   transmission elements which can comprise some of said drive elements, said transmission elements transmitting a rotation movement from said first processing roller to said second processing roller, regardless of a spacing of the first and second processing rollers allowed by the guide device during work;
   wherein:
   said transmission elements are installed in a housing, said housing comprising a first part and a second part which are hinged to one another by a joint, said joint having a geometric axes which is directed at least approximately parallel to the axes of rotation of the first and second processing rollers; and each of said first and second parts is mounted to pivot at least approximately around the axis of rotation of a corresponding one of said first and second processing rollers.

2. A mower according to claim 1, wherein said transmission elements comprise at least a pair of toothed elements for permitting a counter-rotation of said first and second processing rollers.

3. A mower according to claim 1, wherein said housing is at least approximately closed and at least approximately fluidtight.

4. A mower according to claim 1, wherein said transmission elements comprise exclusively toothed elements.

5. A mower according to claim 1, wherein:
said transmission elements comprise first, second and third rotating elements;
said first rotating element is fastened to the drive shaft of the first processing roller;
said second rotating element is centered on the geometric axis of said joint which links together the first and second parts of the housing and is driven in rotation by said first rotating element; and
said third rotating element is fastened to the drive shaft of said second processing roller and driven in rotation by said second rotating element.

6. A mower according to claim 5, wherein the second rotating element comprises a ring gear, toothed on its inside periphery and on its outside periphery, and the first and second rotating elements are respectively first and second toothed wheels, one of said first and second toothed wheels meshing with the inside periphery of said toothed ring gear and the other of said first and second toothed wheels meshing with the outside periphery of said toothed ring gear.

7. A mower according to claim 6, wherein the first toothed wheel meshes with the outside periphery of said toothed ring gear, while the second toothed wheel meshes with the inside periphery of said toothed ring gear.

8. A mower according to claim 1, wherein said first processing roller extends at least approximately horizontally, crosswise to the direction of work and lower than said second processing roller, and that said first processing roller is offset backward, with respect to a direction of advance during work, so that the processed product is thrown backward and upward.

9. A mower according to claim 1, wherein said transmission elements are at least approximately coplanar and the lateral space requirement of the housing is reduced.

10. A mower according to claim 1, wherein:
said drive elements drive said first processing roller on a side where said drive elements are installed; and
said respective drive shafts of said first and second processing rollers are installed on the same side.

11. A mower according to claim 1, wherein said drive elements directly drive the drive shaft of the first processing roller.

12. A mower according to claim 11, wherein the drive shaft of the first processing roller passes through the first part of the housing from one side to the other, said drive shaft of the first processing roller comprises at its end located just on the other side of said first part, a further drive element by which the first processing roller is driven directly.

13. A mower according to claim 1, wherein one of the two parts of the housing comprises at least one disk pivoting around the geometric axis of the joint linking together the two parts of the housing, said pivoting disk, in an off-centered manner, is passed through by the drive shaft of one of said first and second processing rollers.

14. A mower according to claim 13, wherein the second part of the housing comprises only a single pivoting disk connected to the first part of the housing by said joint.

15. A mower according to claim 1, wherein:
the first and second processing rollers extend between two walls installed at least approximately at right angles with the axes of rotation of said first and second processing rollers;
a pivot pin is provided at each longitudinal end of each of said first and second processing rollers;
the guide device comprises four bearings by which said pivot pins are guided; and
the guide device is connected to said walls.

16. A mower according to claim 15, wherein the guide device comprises elastic connections that attenuate vibrations of the first and second processing rollers.

17. A mower according to claim 16, wherein one of said elastic connections is produced by at least one elastic element by which each bearing being used to guide one of said first and second processing rollers is fastened to a corresponding one of said walls.

18. A mower according to claim 16, wherein:
the guide device comprises two guide arms;
each bearing being used to guide one of said first and second processing rollers is connected to a corresponding one of said walls by one of said guide arms, hinged to said wall by a joint exhibiting a pivoting axis parallel to the axis of rotation of said one processing roller, so that said one processing roller can be separated from the other processing roller by pivoting around said pivoting axis; and
one of said elastic connections is produced by an elastically deformable element installed between each guide arm and corresponding wall so as to bring back and press said one processing roller against the other processing roller.

19. A mower according to claim 18, wherein the guide arms and bearings extend outside the walls.

20. A mower according to claim 15, wherein on the side where the housing is installed, corresponding ones of said bearings extend between the housing and a respective one of said walls.

21. A mower according to claim 15, wherein the housing is fastened to a corresponding one of said walls by elastic elements.

22. A mower according to claim 21, wherein:
a) one of said elastic connections is produced by at least one elastic element by which each bearing being used to guide one of said first and second processing rollers is fastened to a corresponding one of said walls; and
b) one of the parts of the housing is fastened to one of said bearings of said other processing roller, and the elastic elements comprise at least said elastic element that is used to connect said bearing to the corresponding one wall.

23. A mower according to claim 22, wherein said one part of the housing is further fastened directly to said one wall by another of said elastic elements.

24. A mower according to claim 1, further comprising:

two groups of said first and second processing rollers located beside one another, and the respective transmission elements are installed on the outside of said two groups.

25. A mower according to claim 1, wherein the mower is intended to be connected to a power-driven vehicle.

* * * * *